May 25, 1943.　　　F. B. BRISTOL　　　2,320,066

SELF-BALANCING CIRCUIT MECHANISM

Filed Oct. 29, 1940

INVENTOR.
Franklin B. Bristol
BY E. C. Sanborn
Attorney

Patented May 25, 1943

2,320,066

UNITED STATES PATENT OFFICE 2,320,066

SELF-BALANCING CIRCUIT MECHANISM

Franklin B. Bristol, Middlebury, Conn., assignor to The Bristol Company, Waterbury, Conn., a corporation of Connecticut Application October 29, 1940, Serial No. 363,275

2 Claims. (Cl. 172—239)

This invention relates to self-balancing electrical instruments, and more especially to instruments of the potentiometer class, wherein a normally balanced electrical network is caused to be unbalanced by changes in the magnitude of a variable which it is desired to measure, said condition of unbalance setting in action instrumentalities tending to rebalance the network and to provide a measure of the rebalancing influence, and hence of the magnitude of the variable.

In instruments of this class it is common practice to include in the electrical network which is subject to unbalance, a galvanometer adapted to produce a deflection representative of the unbalanced condition, and to associate with said galvanometer electrical, mechanical or electromechanical devices commanded by the deflections of the galvanometer and tending to restore a condition of balance by adjustment of a part of the network, usually a resistance member having a slidable contact in circuit therewith. This invention may be considered as of the electrical-relay class, wherein the moving element of the galvanometer carries an electrical contact, serving through the agency of relays to actuate a balancing mechanism in a direction, and to an extent, determined by the deflection of the galvanometer in response to conditions of unbalance. An early example of this class of apparatus is set forth in U. S. Letters Patent No. 642,674, issued to H. L. Callendar, February 6, 1900. In that instrument, the galvanometer pointer carried contacts which are pressed into engagement with coacting contacts solely by the force developed by the unbalance current flowing in the galvanometer winding with the result that the actuating force is necessarily limited, with corresponding restrictions of the sensitivity of the instrument. A marked improvement on that device is set forth in U. S. Letters Patent No. 1,841,558, issued January 19, 1932, to F. F. Uehling, wherein upon closing of the galvanometer contacts due to initial deflection consequent to unbalance of the network, current from an auxiliary source flows through the galvanometer winding, tending to intensify the contact pressure until the current reaches a magnitude sufficient to actuate the control relays in the balancing system, which actuation not only sets in motion agencies for re-balancing the network with an intermittent action, but also interrupts the current through the galvanometer circuit. Thus, the galvanometer is given the property of making a positive contact without chattering, and at the same time is relieved of the duty of opening the relay circuits. A further improvement is found in U. S. Letters Patent No. 2,022,097, issued to F. F. Uehling November 26, 1935, wherein by use of improved relays having more positive operating characteristics than those in his prior invention, and an auxiliary relay having a time-delay attachment greater precision of operation is obtained, and the equivalent speed of the balancing mechanism made to some extent proportional to the magnitude by which the network is unbalanced.

It is an object of the present invention to provide a device in which all the advantages of the improved form of instrument last named may be obtained by the use of two, rather than three, relay members in the control system.

It is further an object to provide a device of the above nature in which the intermittent operating characteristic of the balancing motor shall be to a great degree replaced by continuous operation until the condition of ultimate balance is closely approached.

Further features and advantages of the invention will be hereinafter described and claimed.

Figure 1:
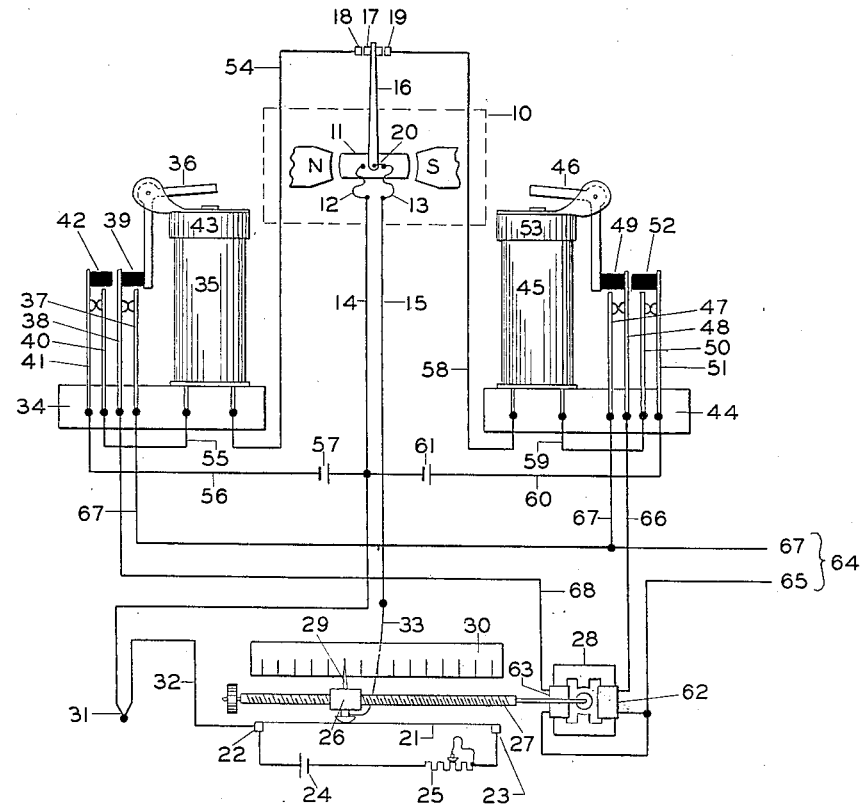
Figure 1 is a diagrammatic view illustrating an embodiment of the invention, in combination with a self-balancing potentiometer.

Referring now to Figure 1 of the drawing:

A galvanometer 10 of the conventional form includes a coil 11 freely pivoted between poles N and S of a permanent magnet or the equivalent. Electrical connection is made to the coil 11 by means of resilient leads or springs 12 and 13 connected respectively to conductors 14 and 15 forming elements in an electrical network hereinafter to be described, whereby upon the passage of current from one conductor to the other through the galvanometer coil the latter will tend to be rotated through a limited angle about its axis in a sense either clockwise or counterclockwise, according to the direction of the current. Carried by the galvanometer coil is a pointer 16 bearing upon its extremity a contact member 17 adapted to engage either of two stationary contacts 18 and 19, according to the sense of deflection. The end of the coil 11 which is connected to the spring 13 is also connected to the pointer 16 by means of a conductor 20, whereby current may pass between the conductor 14 and the pointer 16 by flowing through the galvanometer coil 11.

A potentiometer circuit includes a uniform slide-wire 21 extended between terminals 22 and 23, and supplied with a steady current from a battery 24, whose output may be regulated by means of an adjustable rheostat 25. Slidably engaging said slide-wire is a movable contact member 26, adapted to traverse the extent of the slide-wire, and to be positioned at any point thereon by means of a lead screw 27 adapted for rotation in either direction by a reversible electric motor 28. An index 29, carried by the contact member 26 and cooperating with a graduated scale 30 provides an indication of the position of said contact member with respect to the slide-wire.

While the potentiometer circuit herein described may be utilized to determine the magnitude of an electromotive force derived from any suitable source, it is here shown as applied to the measurement of the thermoelectromotive force developed by a thermocouple 31, and hence of a temperature to which said thermocouple may be exposed. One element of the thermocouple is connected by means of a conductor 32 to the terminal 22 of the slide-wire and the other element to the conductor 14 leading to one side of the galvanometer coil 11. The conductor 15 leading to the other side of the galvanometer is connected by means of a flexible lead 33 to the movable contact member 26 which engages the slide-wire.

According to well known principles upon which the art of potentiometric pyrometry is based, when the direction and intensity of the current in the slide wire 21 are suitably adjusted, the difference between the E. M. F. developed by the thermocouple 31 and the drop along the slide-wire from the terminal 22 to the point of engagement of the contact 26 will cause a current to flow through the galvanometer coil 11, deflecting the same in a direction dependent upon the polarity of said difference in potential. Upon said potential difference being reduced to zero, as may be done by setting the contactor 26 to a suitable position with respect to the slide-wire, the galvanometer deflection also will be reduced to zero, giving a balanced condition in the electrical circuit, when the position of the contact member 26, as indicated by the reading of the index 29 on the scale 30, becomes a measure of the E. M. F. developed by the thermocouple 31, and thus of the temperature to which said couple is exposed.

The setting of the contact member 26 may be varied by means of the lead screw 27 as rotated by the reversible electric motor 28; and for the general practice of placing such a motor under control of galvanometer-actuated contacts, and thus rendering the potentiometer circuit self-balancing, no invention is herein claimed. The novel features of this invention reside in the improved means whereby self-balancing action is obtained, and these means may be described as follows:

A relay 34 embodies an actuating magnet coil 35 and an armature 36 subject thereto. Normally engaged contacts 37 and 38 are adapted to be separated by movement of the armature transmitted through an insulating pad 39 when the coil 35 is energized. Further contacts 40 and 41 also normally engaged, are adapted to be separated by movement of said armature transmitted through an insulating pad 42, when the coil 35 is energized. The spacing and dimensions of the pads 39 and 42 are so proportioned that upon deflection of the armature 36 in response to excitation of the coil 35 the contacts 40 and 41 will remain in engagement until the armature has been moved through an appreciable distance after that required to separate the contacts 37 and 38. The coil 35 is fitted with a short-circuited lag-plate or shroud 43, whereby, in accordance with well-known principles there will be introduced an appreciable time-lag between the closing or breaking of a circuit through the winding, and the attainment of a magnetic flux value to correspond to the E. M. F. applied to the terminals of the winding. Thus, upon the application of an E. M. F. to the coil, the movement of the armature to its final position will require an appreciable time, so that the contacts 37 and 38 will first be separated and the circuit of which they form a part opened, and subsequently the contacts 40 and 41 will be separated, and the circuit of which they form a part opened. Similarly, upon de-energization of the winding, the contacts will be closed in reverse order—first the contacts 40 and 41, and subsequently the contacts 37 and 38.

A relay 44, similar in all respects to relay 34, embodies a magnet coil 45 and an armature 46, together with normally closed contacts 47 and 48, actuated by said armature through an insulating pad 49, and further normally closed contacts 50 and 51 actuated through an insulating pad 52. The coil 45 is fitted with a shroud 53, and all the elements of the relay 54 are proportioned and adjusted to give a performance substantially identical with that of the relay 34, so that upon energization of the coil 45 first the contacts 47 and 48, and subsequently the contacts 50 and 51 are opened, and upon de-energization, the same contact pairs are closed in reverse sequence.

The galvanometer contact 18 is connected through a conductor 54 to one terminal of the coil 35, and the free terminal of that coil by means of a conductor 55 to the contact 40. The contact 41 is connected by means of a conductor 56 to one terminal of a small battery 57, and the other terminal of said battery to the conductor 14. The galvanometer contact 19 is connected through a conductor 58 to one terminal of the coil 45, and the free terminal of that coil by means of a conductor 59, contacts 50, 51, and conductor 60 to one terminal of a small battery 61, and the other terminal of said battery to the conductor 14.

It will be seen that upon deflection of the galvanometer pointer sufficiently to engage the contact 18, a circuit will be completed from the battery 57 through the normally-closed contacts 40—41, the magnet winding 35, the contacts 18 and 17 and the galvanometer coil 11 to the conductor 14 and thence to the battery. Similarly, upon deflection of the galvanometer pointer to a position of engagement with the contact 19, a circuit will be formed from the battery 61 through contacts 50—51, magnet coil 45, contacts 19 and 17, the galvanometer coil 11 and the conductor 14 back to the battery. The galvanometer coil 11 is so connected that upon a current flow therein corresponding to a circuit unbalance resultant upon a decrease of E. M. F. developed by the thermocouple 31 below the opposing potential derived from the slide-wire by the contact 26, the arm 16 will be deflected in a counter-clockwise sense and vice versa.

It may be here be remarked that, while in either of the above connections a portion of the potentiometer network will form a shunt across the galvanometer coil, it is practicable by the proper proportioning of resistance values in different parts of the circuits to maintain in the galvanometer coil a sufficient current to produce the desired result.

The polarities of the batteries 57 and 61 are so selected with respect to that of the potentiometer circuit that, upon deflection of the galvanometer in either direction by current derived from said circuit flowing in the coil 11, the supplementary current in said coil derived from the corresponding battery will be in such a direction as to tend to deflect the galvanometer in the same direction, thus supplementing the original deflective effort, and tending to intensify the pressure between the contact 17 and the stationary contact engaged thereby.

The reversible motor 28 is fitted with two windings 62 and 63, adapted upon individual energization from a suitable electric power supply 64 to operate the motor in a sense to move the contact member 26 to the left or the right respectively as seen in the drawing, along the slide-wire 21. One terminal of each of the windings 62 and 63 is connected to a common conductor 65 representing one side of the electric supply 64. The free terminal of the winding 62 is connected by means of a conductor 66 to the contact 48, and the contact 47 by a conductor 67 to the other side of the supply 64. The free terminal of the winding 63 is connected by means of a conductor 68 to the contact 38 and the contact 37 to the conductor 67. Thus, it will be seen that with the contact pairs 37—38 and 47—48 in their normally closed positions, both windings of the motor 28 will be simultaneously energized, tending to stall the same, and that with one of these contact pairs opened while the other remains closed, the motor will be energized for rotation in a corresponding direction, and will be caused to operate in that sense. While a similar form of control in which both contact pairs are normally open, instead of closed, would be operative, the normally-closed arrangement as hereinabove described, has been found effective and preferable, providing among other advantages a simple form of dynamic braking not characterizing other control arrangements.

Figure 2:
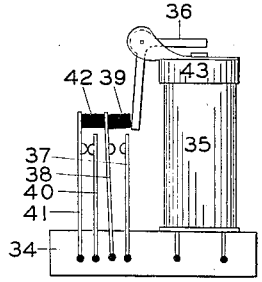
Figures 2 and 3 show in two characteristic operating positions a relay adapted for use in the invention.

The operation of the device is as follows: It may first be assumed that there has been attained a condition of equilibrium in which the E. M. F. developed by the thermocouple 31 is exactly balanced by that derived from the slide-wire 21 by the contact 26, the galvanometer being in its undeflected position, the pointer contact 17 not in engagement with either of the contacts 18 and 19, and all elements of the mechanism in the positions shown in Fig. 1. It may now be assumed that due to a lowering of the temperature to which the thermocouple is exposed, the thermoelectromotive force derived therefrom becomes less, so that the opposed potential corresponding to the shown position of the contact 26 along the slide-wire is no longer balanced. The galvanometer, as hereinabove set forth, will be deflected in a counter-clockwise sense, causing the contact 17 carried by the arm 16 to engage the stationary contact 18, completing a circuit whereby a current may flow from the battery 57 through the contacts 41 and 40, the magnet coil 35 and the galvanometer coil 11 in a sense to supplement the current originally responsible for the deflection, and thus to intensify the force of engagement of the contacts 17 and 18. This intensification of the contact force, as has already been pointed out in the hereinbefore mentioned Uehling patents, will tend to break down any contact resistance which may exist, allowing the current flowing through the magnet 35 to attain a value sufficient to attract the armature 36, and to attain that value as rapidly as permitted by the inductive characteristics of the circuit. As the armature 36 responds to the attractive force of the electromagnet and completes a part of its possible excursion as shown in Fig. 2, the pad 39, under the influence of said armature will cause the contacts 37 and 38 to be separated, opening the circuit to the winding 63 on the motor 28, which, in turn allows the winding 62 to operate the motor, and from it, through the screw 27, the contact 26, in a sense to move said contact toward the left, and reduce the value of E. M. F. derived from the slide-wire 21 in opposition to the thermoelectromotive force derived from the couple 31.

Figure 3:
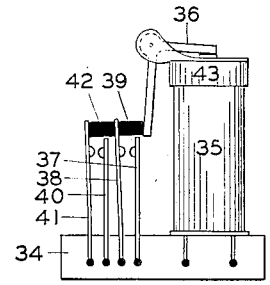

As the excursion of the armature 36 continues, the pad 42 will be engaged, and the contacts 41 and 40 separated as shown in Fig. 3, which will interrupt the current flowing in the magnet winding 35, tending to release the armature 36 and re-close the contact pair 41—40, which, if the galvanometer contacts 17—18 are still closed, will reestablish the circuit through the magnet coil 35, causing the armature 36 again to be attracted, thus setting up a vibratory or fluttering action of the armature, which will continue as long as the galvanometer remains in its deflected position, the frequency of vibration being limited by the electrical characteristics of the circuit and of the shroud 43. The lengths and positions of the pads 39 and 42 are so proportioned that, with the fluttering action taking place as described, the complete cycle of vibration may take place without the armature 36 moving sufficiently far from the magnet to allow the contact pair 37—38 to be closed, so that during the time of vibration, that is to say, so long as the galvanometer contacts remain closed, the motor 28 will continue to operate in a sense to rebalance the potentiometer circuit.

Upon a condition of balance being approached, the current from the potentiometer circuit flowing in the galvanometer coil 11 will approach and ultimately attain a zero value, so that upon interruption of the battery circuit by the contact pair 40—41 there will remain no deflecting current in the galvanometer coil 11, and the arm 16 will move to its neutral position, opening the contacts 17—18, releasing the relay 34, which will revert to the position shown in Fig. 1, closing the contact pair 37—38 and bringing the balancing motor 28 to rest. In the event of the thermocouple E. M. F. increasing, unbalance current will cause the galvanometer to deflect in a sense to close the contacts 17—19, causing the relay 44 to perform in a manner identical with that hereinbefore set forth with respect to the relay 34, thus operating the motor 28 in a direction to move the contact 26 to a point of higher potential on the slide-wire 21, and tending to rebalance the circuit. Thus, there has been provided a system and mechanism embodying a potentiometer circuit, and rendering the same automatically self-balancing with the following highly advantageous operating characteristics:

(1) Because of the inductive characteristics of the relay magnet coil, the galvanometer contacts at the moment of closing are required to establish only the minimum value of current; and as this current grows to its final value, the pressure of engagement of the contacts is proportionately increased.

(2) By means of the auxiliary current intermittently flowing in the galvanometer winding, the galvanometer contacts are caused to make positive engagement, thus eliminating the possibility of chattering, without in any way detracting from the sensitivity of the galvanometer to respond to conditions of unbalance or of restoration of balance.

(3) The relay contacts in series with the magnet coil and opened thereby to produce the characteristic fluttering action relieve the galvanometer contacts of the duty of interrupting current.

(4) Because the fluttering action of the relay takes place without interference with the motor action, the rebalancing motor operates continuously and at a uniform speed until a condition of balance is attained, and then comes quickly to rest.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for automatically balancing an electric circuit, said apparatus comprising a galvanometer responsive to unbalance conditions of said circuit and including an element deflectible in a direction corresponding to the direction of unbalance, contact means actuated by said element according to its direction of response, reversible electric motor means for balancing said circuit, a pair only of relays controlled by said contact means and each corresponding to a respective direction of operation of said motor means, each of said relays having a winding and an armature together with a pair of solid contacts in a circuit for controlling said motor and another pair of solid contacts in circuit with the relay winding and the aforesaid contact means, means supporting said pairs of contacts of each relay separately from the relay armature, said pairs of contacts of each relay being so disposed with respect to each other and to the relay armature that upon operation of said armature pursuant to closure of a circuit through said relay the pair of motor circuit contacts is actuated first to bring the motor into operation and thereafter the pair of relay circuit contacts is operated to break the circuit through the relay winding.

2. Apparatus for automatically balancing an electric circuit, said apparatus comprising a device responsive to unbalance conditions of said circuit and deflectible in a direction corresponding to the direction of unbalance, reversible electric motor means for balancing said circuit, circuits connected to said motor means for causing operation thereof in directions corresponding to the respective directions of unbalance, a relay comprising a winding and an armature, a circuit controlled by said device for energizing said winding upon deflection of said device in one direction, said relay having a pair of solid contacts in its winding circuit and another pair of solid contacts in one of said motor circuits, a second relay comprising a winding and an armature, a circuit controlled by said device for energizing the winding of said second relay upon deflection of said device in the opposite direction, said second relay having a pair of solid contacts in its winding circuit and another pair of solid contacts in the other of said motor circuits, the respective pairs of contacts of each of said relays being so disposed with respect to each other and to the relay armature that in response to energization of said relay the pair of motor contacts is operated first to cause operation of said motor and the pair of winding contacts is thereafter operated to break the circuit through the relay winding.

FRANKLIN B. BRISTOL.